J. B. BORST.
MECHANICAL MOVEMENT.
APPLICATION FILED APR. 10, 1912.
1,176,027.
Patented Mar. 21, 1916.
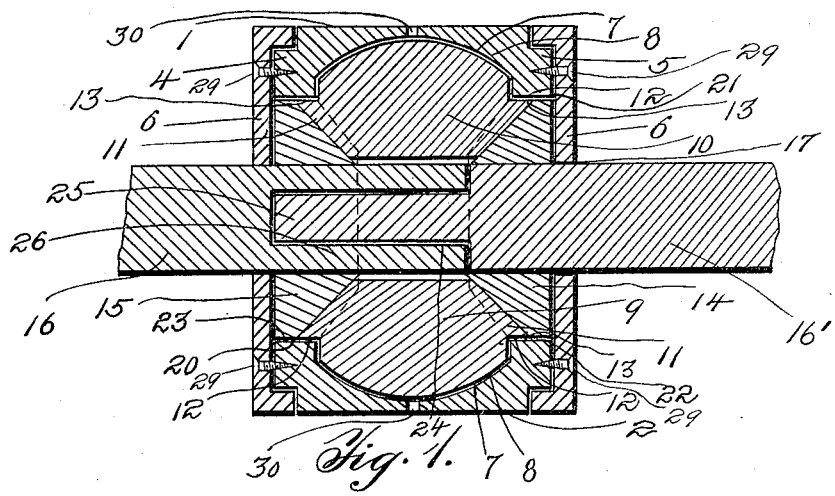
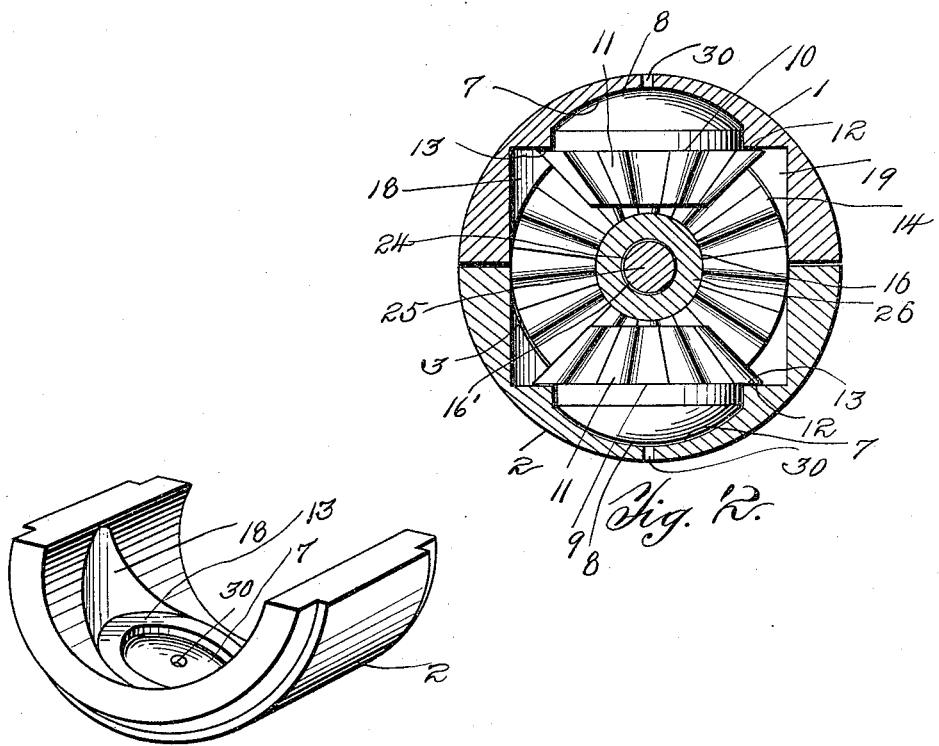
Witnesses
M. P. McKee
G. C. Tracy
Inventor
J. B. Borst
By Alex. J. Wedderburn, Jr.
Attorney

UNITED STATES PATENT OFFICE.

JOHN B. BORST, OF ELMHURST, NEW YORK.

MECHANICAL MOVEMENT.

1,176,027.　　　　Specification of Letters Patent.　　Patented Mar. 21, 1916.

Application filed April 10, 1912. Serial No. 689,774.

*To all whom it may concern:*

Be it known that I, JOHN B. BORST, a citizen of the United States, residing at Elmhurst, Long Island, in the county of Queens and State of New York, have invented certain new and useful Improvements in Mechanical Movements, of which the following is a specification.

This invention relates to improvements in mechanical movements.

The object of my invention is to provide a simple, efficient, and inexpensive gear mechanism. The gear mechanism is mounted in a compact housing, and the various connections are readily removable from said housing.

A further object of my invention is to provide a bearing for driving and driven toothed-wheels in which the various parts will be held snugly in a housing by means of the frictional engagement of the sides of said bearing. To this end I have designed a collapsible housing so arranged and constructed that the various gear elements may be readily disengaged from each other and from said housing.

With the above and other objects in view my invention consists in the arrangement, combination, and details of construction clearly shown in the drawings, described in the specification, and then pointed out in the appended claims.

In the drawings Figure 1 is a cross-sectional elevation of my invention. Fig. 2 is an end elevation, partly in section, thereof, Fig. 3 is a perspective view of one of the housing sections.

Reference being made to the accompanying drawings wherein similar reference characters designate similar parts wherever found, I show a housing composed of the sections 1 and 2. It will be understood that the housing will, in practice, be fixed in position so that it will not rotate together with the gear wheels. The housing is intended to be only a convenient bearing for the gear wheels. The housing is arranged to receive two pairs of bevel wheels, and said wheels will be snugly incased by said housing so that only two shafts shall protrude therefrom. The sections 1 and 2 may have any suitable configuration so that when in super-posed relation a hollow body 3 is formed, and in this body the bevel wheels will be inclosed. For the purpose of illustration the sections 1 and 2 are shown segmental or semicylindrical in contour, and are formed at each end with shoulders 4 and 5 respectively, so that when said segments are held in super-posed position the caps 6 may be slid over said shoulders to prevent the displacement thereof; said caps will fit said shoulders flush with the circumference of the joined sections 1 and 2, and may, by any means such as screws be secured to said shoulders so as to form a housing.

The segmental sections 1 and 2 when united, as above described, provide the cylindrical space 3 in which the gear mechanism will be mounted. Each of said sections is formed with a central dish-shaped recess 7 adapted to receive the correspondingly-shaped surface 8 of a bevel wheel 9 and 10 respectively, the teeth 11 of said bevel wheels being flattened as at 12 so as to run along a track or way 13 made especially to accommodate them and to provide clearance for said teeth in their movement. Meshing with the bevel wheels 9 and 10 are the bevel wheels 14 and 15 mounted upon the shafts 16' and 16, which shafts protrude from the openings 17 formed in said caps. It will be noticed that a portion of the inner surface of each of said sections is cut away at 18 and 19 at diametrically opposite points, so as to coöperate to form the way 13, as clearly shown in Fig. 2. When said sections are held in joined relation, the cylindrical portions 20 and 21 forming the outermost surfaces of the bevel wheels 14 and 15 will have to revolve freely in the housing and bear against the correspondingly-shaped endmost surfaces 22 and 23 formed upon each section 1 and 2, said portions 20 and 21 being suitably lubricated so as to revolve frictionlessly in the housing formed by said joined sections. The shaft 16 is formed, preferably within the plane of the housing with a cylindrical socket 24 adapted to receive a correspondingly-shaped reduced portion or tenon 25 formed upon the shaft 16', so that the bevel wheels 14 and 15 may be free to rotate in opposite directions in the housing in which they are incased. By means of the groove and tenon relation of said shaft they are held, at all times, in axial alinement, a desirable feature in gear mechanism.

When the parts are in operative position the bevel wheels 9 and 10 will be seated in their recesses in parallel relation, and the bevel wheels 14 and 15 mounted on the shafts 16' and 16 will be disposed parallel each to each, and will be disposed at right-angles with respect to and be in mesh with the first named bevel wheels.

When the bevel wheels are in the position above described, it will be obvious that by turning shaft 16' clock-wise, the oppositely arranged shaft 16 will, through the intermeshing oppositely arranged and seated bevel wheels 9 and 10, turn counter-clockwise, and vice versa. Owing to the width of the way 13 the teeth of the bevel wheels 9 and 10 will not engage the innermost surface of the cutaway portions 18 and 19 formed upon the sections 1 and 2, thereby facilitating the rotation of said last named bevel wheels. To dismantle the housing formed by said sections the screws 29 will be removed, then the caps 6 will be removed, and the sections may then be taken apart as well as the oppositely arranged shafts 16 and 16', held against endwise displacement by means of said caps. The housing formed will conceal from view the gear mechanism which I have devised. It will be observed that one of the caps 6 may be removed so as to enable the tenon 25 formed upon the driven shaft 16' to be retracted out of the socket of the driving shaft 16 a sufficient distance to throw the bevel wheel 14 out of mesh with the seated oppositely arranged bevel wheels 9 and 10, so that said driven shaft will cease to rotate despite the rotation of the driving shaft 16 and the remaining bevel wheels.

In order to provide for the lubrication of the bevel wheels, oil or any other desirable lubricant may be introduced into the housing through the ports 30, shown clearly in Figs. 1 and 2. In this way the four bevel wheels may constantly be lubricated so as not to be hampered in making each revolution, and so as not to bear with too much friction upon the seats provided for them in the housings.

Numerous modifications may be resorted to in practice without departing in principle from the invention disclosed.

What I desire to secure by Letters Patent is:—

1. In combination two semi-cylindrical sections united to form a single member, end plates removably secured to said member to form a casing, two bevel gears, each having a smooth surface snugly fitting the inner circumference of said member, a separate shaft section upon which each of said gears is fixed, each of said sections projecting externally of said casing out of said end plates, oppositely arranged idle bevel gears mounted in said casing and meshing with said first-named bevel gears, and convex trunnions carried by said idle bevel gears and rotatably seated in said member, said casing being formed with oil ports at opposite points in the axial plane of said trunnions.

2. In combination two semi-cylindrical sections united to form a single member, end plates removably secured to said member to form a casing, two bevel gears, each having a plane surface snugly fitting the inner surfaces of said plate, a separate shaft section upon which each of said gears is fixed, each of said sections projecting externally of said casing out of said end plates, oppositely arranged idle bevel gears having trunnions mounted in said casing and meshing with said first-named bevel gears and rotatably seated in said member, said casing being formed with oil ports at opposite points in the axial plane of said trunnions, one of said shaft sections having a reduced end adapted to seat in a recess in the end of said other shaft section.

3. In combination two semi-cylindrical sections united to form a single member, end plates removably secured to said member to form a casing, two bevel gears, each having a smooth surface snugly fitting the inner circumference of said member, a separate shaft section upon which each of said gears is fixed, each of said sections projecting externally of said casing, oppositely arranged idle bevel gears mounted in said casing and meshing with said first-named bevel gears, and convex trunnions carried by said idle bevel gears and rotatably seated in said member, said casing being formed with oil ports at opposite points in the axial plane of said trunnions, said semi-cylindrical sections having recesses formed therein to receive said trunnions, one of said shaft sections having a reduced end adapted to seat in a recess in the end of said other shaft section, said plates having annular right angular flanges adapted to seat upon and hold said sections fixedly connected.

4. Gear mechanism comprising two segmental sections forming a cylindrical member, annular shoulders formed upon the opposite edges of said member, idle bevel wheels arranged at diametrically opposite points in said member, each of said sections being formed with a dish-shaped depression, convex trunnions formed integrally upon said idle bevel wheels and rotatably seated in said depressions, said sections being cut-away to provide a track for the teeth of said idle bevel wheels, caps engaging said shoulders to close said member, means for removably holding said caps against displacement, shafts passing through said caps, bevel wheels fixed upon said shafts and meshing with said idle bevel wheels, said shafts arranged to protrude laterally of said member, and a tenon formed upon the inner end of one of said shafts, the other shaft being formed with a mortise receiving said tenon, said sections being formed with oil-receiving ports opening into said dish-shaped recesses.

5. In combination two semi-cylindrical sections united to form a single member, end plates removably secured to said member to form a casing therewith, two bevel gears, each having a smooth annular surface snugly fitting the inner circumference of said member, a separate shaft section upon which each of said gears is fixed, each of said sections projecting externally of said casing out of said end plates, oppositely arranged idle bevel gears mounted in said casing and meshing with said first-named bevel gears, and convex trunnions carried by said idle bevel gears and rotatably seated in said member, said casing being formed with oil ports at opposite points in a plane with said trunnions.

In testimony whereof I affix my signature in presence of two witnesses.

JOHN B. BORST.

Witnesses:
　JOHN T. CROSAN,
　CYRUS WARMBOLD.

Copies of this patent may be obtained for five cents each, by addressing the "Commissioner of Patents, Washington, D. C."